United States Patent [19]
Ishida

[11] Patent Number: 5,312,700
[45] Date of Patent: May 17, 1994

[54] SOLID OXIDE FUEL CELL AND METHOD FOR PRODUCING THE SAME

[75] Inventor: Yoshihiko Ishida, Nagoya, Japan

[73] Assignee: NGK Insulators, Ltd., Japan

[21] Appl. No.: 855,661

[22] Filed: Mar. 23, 1992

[30] Foreign Application Priority Data

Mar. 27, 1991 [JP] Japan .................. 3-085841

[51] Int. Cl.⁵ .......................... H01M 8/10
[52] U.S. Cl. ........................ 429/30; 429/33; 429/31; 429/34; 429/32; 29/623.4; 29/623.5; 427/115
[58] Field of Search ............ 429/30, 31, 34, 32, 429/33; 427/115; 29/623.4, 623.5, 623.5

[56] References Cited

U.S. PATENT DOCUMENTS

| | | | |
|---|---|---|---|
| 4,396,480 | 8/1983 | Hegedus et al. | 429/30 |
| 4,857,420 | 8/1989 | Maricle et al. | 429/30 |
| 5,162,167 | 11/1992 | Minh et al. | 429/30 |

FOREIGN PATENT DOCUMENTS

1-128359  5/1989  Japan .

*Primary Examiner*—Olik Chaudhuri
*Assistant Examiner*—C. Everhart
*Attorney, Agent, or Firm*—Parkhurst, Wendel & Rossi

[57] ABSTRACT

A solid oxide fuel cell including a flat plate-shaped solid oxide fuel cell element. The cell element is composed of an ion-conductive ceramic plate formed with ribs connected with each other in a plane, an air electrode formed on one main surface of the ion-conductive ceramic plate, and a fuel electrode formed on the other main surface of the ion-conductive ceramic plate. In producing the fuel cell, a flat plate-shaped green sheet made of an ion-conductive ceramic molding material is press contacted with a rib-forming green sheet made of a material of the same kind and having a unitary shape formed by connecting elongated portions to each other. The contacted green sheets are sintered together to form an ion-conductive ceramic plate. In an alternative, a flat plate-shaped green sheet and a rib-forming green sheet may be separately sintered and then bonded with each other to form an ion-conductive ceramic plate. The ion-conductive ceramic plate is formed with an air electrode surface and a fuel electrode on opposite main surfaces, respectively.

8 Claims, 7 Drawing Sheets

FIG_3

FIG. 4

FIG_5

FIG_6

FIG_7

FIG_8

SOLID OXIDE FUEL CELL AND METHOD FOR PRODUCING THE SAME

BACKGROUND OF THE INVENTION

1. Field of the Invention

The present invention relates to a solid oxide fuel cell which generates electric power by the use of a flat plate-shaped solid oxide fuel cell element and a method for producing the solid oxide fuel cell.

2. Related Art Statement

Recently, fuel cells have been recognized as power generating equipment. The fuel cell is capable of directly converting chemical energy possessed by fuel to electric energy. Since the fuel cell is free from limitation of Carnot's cycle, the cell is a very promising technique owing to its high energy conversion efficiency, wide latitude of fuels to be used (naphtha, natural gas, methanol, coal reformed gas, heavy oil and the like), less public nuisance, and high electric power generating efficiency without being affected by scale of installation.

Particularly, since the solid electrolyte fuel cell (hereinafter referred to as "SOFC") operates at high temperatures of 1,000° C. or so, activity of electrodes is very high. Thus, no catalyst of a noble metal such as expensive platinum is necessary. In addition, since the SOFC has low polarization and relatively high output voltage, its energy conversion efficiency is conspicuously much higher than those of the other fuel cells. Furthermore, since their constituent materials are all solid, the SOFC is stable and has long service life.

Since such fuel cells can be constructed by solid structural materials, various kinds of cell structures have been proposed. Among the so-called flat plate-shaped solid oxide fuel cells are structurally very promising because their electric power per unit volume can be easily increased.

With the flat plate-shaped SOFC and monolithic SOFC, however, there are problems in producing techniques and the like as follows.

An ion-conductive film of zirconia has been formed on a flat plate-shaped porous support by means of chemical vapor deposition (CVD), physical vapor deposition (PVD) or electrochemical vapor deposition (EVD). However, apparatuses for use in CVD, PVD and EVD are generally expensive and large in size. Moreover, film forming speeds are low so that these methods are low in productivity and not suitable for mass production and it is difficult to obtain films of wide areas. Furthermore, internal resistance in the cells is high owing to diffusion resistance of fuel gases passing through porous supports.

A method has been proposed to form corrugated green sheets of an ion-conductive film of zirconia, an air electrode film and a fuel electrode film, press contact these green sheets and sinter them. In this method, however, since green sheets of different materials are sintered together, it is difficult to adjust their shrinkages during firing. Further, when the green sheets are press contacted with one another, the green sheets are likely to be cracked or fractured. Moreover, insulating layers tend to be produced at interfaces between the ion-conductive film and the electrode films after they are sintered together.

In order to overcome these problems, Japanese Patent Application Laid-open No. 1-128,359 disclosed a method in which an ion-conductive plate of zirconia is formed by sintering, electrodes are formed on its both surfaces to form a flat plate-shaped SOFC element, and such SOFC elements and insulating spacers are alternately laminated to form a SOFC.

However, inventor's investigations revealed that these methods involved the following problems.

That is, in the SOFC using such so-called self-standing ion-conductive ceramic plates, the green sheet of the flat plate-shaped ion-conductive ceramic plate are formed by the tape-casting method. In operating such a laminated SOFC, the ion-conductive ceramic plate undergoes a difference in pressure between a fuel gas and an oxidizing gas in a fuel gas chamber and an oxidizing gas chamber provided on both sides of the ceramic plate, respectively In order to resist emergency gas purging, the ion-conductive ceramic plate must be made thick to prevent any cracks and fracture On the other hand, in order to restrain an increase in resistance to the ion-conduction, the ion-conductive ceramic plate must be made thin. It is difficult, however, to fulfill the contradictory requirements. Therefore, the structural strength and internal resistance of the flat plate-shaped SOFC element are not sufficient up to now.

SUMMARY OF THE INVENTION

It is an object of the invention to provide a solid oxide fuel cell including an ion-conductive ceramic plate having a low ion-conduction resistance and a flat plate-shaped solid oxide fuel cell element having a high structural strength, and a method for producing the solid oxide fuel cell.

In order to accomplish the above object, the solid oxide fuel cell according to the invention includes a flat plate-shaped solid oxide fuel cell element composed of an ion-conductive ceramic plate having ribs connected to the plate, an air electrode formed on one main surface of the ion-conductive ceramic plate, and a fuel electrode formed on the other main surface of the ion-conductive ceramic plate.

The method for producing the solid oxide fuel cell according to the invention includes the steps of press fitting a flat plate-shaped green sheet made of an ion-conductive ceramic molding material to a rib-forming green sheet made of a material of the same kind as that of the flat plate-shaped green sheet and having a unitary shape formed by a plurality of rows of elongated portions connected to each other, co-sintering the press-fitted flat plate-shaped green sheet and rib-forming green sheet to form an ion-conductive ceramic plate from the flat plate-shaped green sheet and to form a plurality of rows of ribs from the rib-forming green sheet, and forming an air electrode on one main surface of the ion-conductive ceramic plate and a fuel electrode on the other main surface of the ion-conductive ceramic plate.

In another aspect of the invention, the method for producing the solid oxide fuel cell includes steps of sintering a flat plate-shaped green sheet made of an ion-conductive ceramic molding material to form an ion-conductive ceramic plate, sintering a rib-forming green sheet having a unitary shape formed by a plurality of rows of elongated portions connected to each other to form a rib-forming plate, bonding the ion-conductive ceramic plate to the rib-forming plate, and forming an air electrode on one main surface, of the ion-conductive ceramic plate and a fuel electrode on the other main surface of the ion-conductive ceramic plate.

According to the invention, the ion-conductive ceramic plate of the SOFC is formed with a plurality of rows of ribs which are connected with each other as viewed in a plane. Therefore, the ion-conductive ceramic plate is supported by a plurality of rows of the ribs connected with each other. Since the ion-conductive plate is exposed, excluding portions covered by the ribs, the ion-conductive ceramic plate can be made thinner to diffuse ions at the portions of the ceramic plate devoid of the ribs so as to produce electric power. Although the ceramic plate is made thin a plurality of the ribs connected to each other support the ion-conductive ceramic plate. Therefore, the SOFC element can be prevented from being fractured or cracked. By making thinner the ion-conductive ceramic plate itself in this manner, output of the SOFC element can be increased.

These and other objects, features and advantages of the invention will be appreciated upon reading of the following description of the invention when taken in conjunction with the attached drawings, with the understanding that some modifications, variations and changes of the same could be readily made by the skilled person in the art to which the invention pertains without departing from the spirit of the invention or the scope of the claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
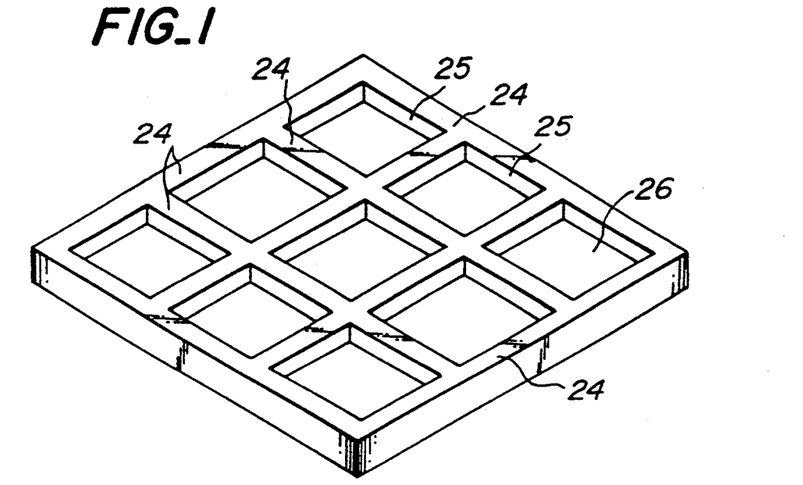
FIG. 1 is a perspective view illustrating an ion-conductive ceramic plate formed with ribs in the form of a lattice according to the invention.

The perspective view of FIG. 1 illustrates one embodiment of the ion-conductive ceramic plate according to the invention. In this embodiment, for example, an ion-conductive ceramic plate 26 in the form of a substantially square flat plate viewed in a plan view is formed, on its main surface, with a plurality of ribs 24. More specifically, four rows of ribs 24 are provided in parallel with and spaced apart from each other at an equal interval, and at the same time an additional four rows of ribs 24 are provided intersecting the former four ribs 24 at right angles. As a result, the eight ribs 24 in rows and columns are connected with each other as viewed in a plan view to form a checkerboard pattern lattice. Nine substantially square recesses 25 are formed between these ribs 24. In addition to the ribs 24, the rear main surface of the plate 26 may be formed with ribs (not shown) similar to the ribs 24 to form a similar checkerboard pattern lattice.

An air electrode is formed on one main surface of the ion-conductive ceramic plate 26, while a fuel electrode is formed on the other main surface of the plate 26. In this case, the main surface formed with the ribs 24 may be provided with any one of the air electrode and the fuel electrode As described above, the ribs forming the lattice pattern may be provided on each of the opposite main surfaces.

According to this embodiment of the invention, the ion-conductive ceramic plate 26 is rigidly held and supported by the lattice pattern of the ribs 24. In other words, since the ion-conductive ceramic plate is thicker at locations having the ribs, strength is greater there as compared with locations corresponding to the recesses 25. Further, since the intersecting ribs 24 form the lattice construction, mechanical strength of the plate 26 is great from the viewpoint of the structural dynamics.

On the other hand, the ion-conductive ceramic plate 26 is exposed at the recesses 25. Therefore, the ceramic plate 26 is made thinner at the location corresponding to the recesses 25 so that ions may be diffused there to effect power generation. As mentioned above, since the the lattice pattern formed by combining the ribs 24 increases the mechanical strength of the SOFC element, a far thinner ceramic plate 26 is sufficient to prevent fracture of the SOFC element. The output of the entire SOFC element can be increased by making thinner the ion-conductive ceramic plate 26 itself in this manner than in the prior art.

The ribs 24 may be formed from an ion-conductive ceramic material or a non-ion-conductive ceramic material. However, the ribs 24 are preferably made of an ion-conductive ceramic material, because ions are diffused even through the lattice to a certain extent to aid the power generation. In this case, the ribs 24 are more preferably made of a ceramic material identical with that of the ion-conductive ceramic plate 26, because the lattice is compatible with the plate 26.

Moreover, the ion-conductive ceramic plate 26 is preferably made of zirconia, and more preferably made of zirconia completely or partially stabilized with yttria, calcia, magnesia or ceria.

Figure 2:
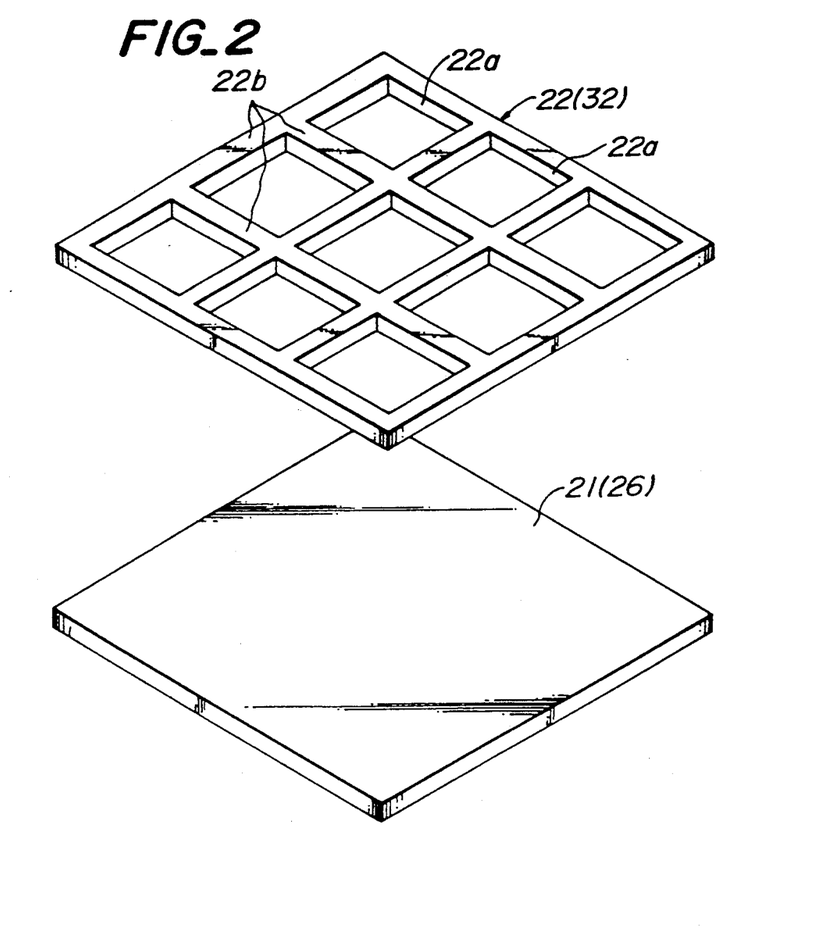
FIG. 2 is a perspective view for explaining processes of producing the ion-conductive ceramic plate shown in FIG. 1.

Methods for producing the structure as shown in FIG. 1 will be explained hereinafter by referring to FIG. 2.

In a first method, a flat plate-shaped green sheet 21 is first produced by an ion-conductive ceramic raw material. A rib-forming green sheet 22 is separately produced by a material of the same kind as that of the green sheet 21. The rib-forming green sheet 22 is provided with four rows of elongated portions 22b parallel to each other and spaced by a substantially equal distance from each other, and further provided with four elongated portions 22b intersecting the first portions 22b at right angle and spaced by the substantially equal distance from each other. The eight elongated portions 22b form a lattice pattern similar to that shown in FIG. 1 in this manner. This lattice pattern includes through-opening portions 22a in three rows and three columns.

Thereafter, the flat plate-shaped green sheet 21 and the rib-forming green sheet 22 are press contacted with each other and co-sintered so that the flat plate-shaped green sheet 21 becomes an ion-conductive ceramic plate 26 and the rib-forming green sheet 22 becomes ribs 24 in the form of a lattice. In this case, since the flat plate-shaped green sheet 21 and the rib-forming green sheet 22 are sintered together, they should be made of materials of the same kind in consideration of shrinkage in sintering, etc. However, composition proportions of the materials may be somewhat different from each other within a permissible range for sintering them together.

In the second method, a flat plate-shaped green sheet 21 is sintered to produce an ion-conductive ceramic plate 26, and a rib-forming green sheet 22 is sintered to produce a rib-forming plate 32. In this case, configurations of the ion-conductive ceramic plate 26 and the rib-forming plate 32 are substantially the same provided that shrinkage due to sintering is ignored. Therefore, the ceramic plates 26 and the rib-forming plate 32 are designated by bracketed reference numerals in FIG. 2 for the sake of convenience.

Thereafter, the ion-conductive ceramic plate 26 and the rib-forming plate 32 are bonded to each other to form a unitary body as shown in FIG. 1. In this case, the rib-forming plate 32 is preferably formed from an ion-conductive ceramic material, and more preferably formed from the same material as the ion-conductive ceramic plate 26. In both cases, before bonding them, a slurry of a raw material to form the ion-conductive ceramic is preferably coated on the surfaces of them to be bonded, and they are bonded by heating, in order to insure the ion conductivity at the interface between them.

The rib-forming plate 32 may be formed from a ceramic having no ion conductivity, for example, alumina, mullite, porcelain or the like. In this case, a slurry of a raw material to form an insulating ceramic may be used in bonding the two plates.

While the ribs 24 are provided in the four rows and four columns in the embodiment shown in FIG. 1, the numbers of the rows and columns may be changed. The number of the recesses 25 may also be changed. The lattice pattern is not always restricted to the checkerboard pattern lattice shown in FIG. 1, but any pattern may be formed by changing the arrangement of the ribs 24. For example, the recesses 25 may be regular hexagonal, regular triangular, isosceles triangular, rectangular or the like. Moreover, an incomplete checkerboard pattern lattice may be used which is formed by partially removing some ribs from the checkerboard pattern lattice shown in FIG. 1. However, the ribs 24 in a plurality of rows and columns are connected to each other in a plan view as shown in FIG. 1 in order to maintain the structural strength to a relatively high level.

Next, one example of an SOFC (collected cell) suitably utilizing the flat plate-shaped SOFC elements constructed above will be explained hereinafter.

Figure 3:
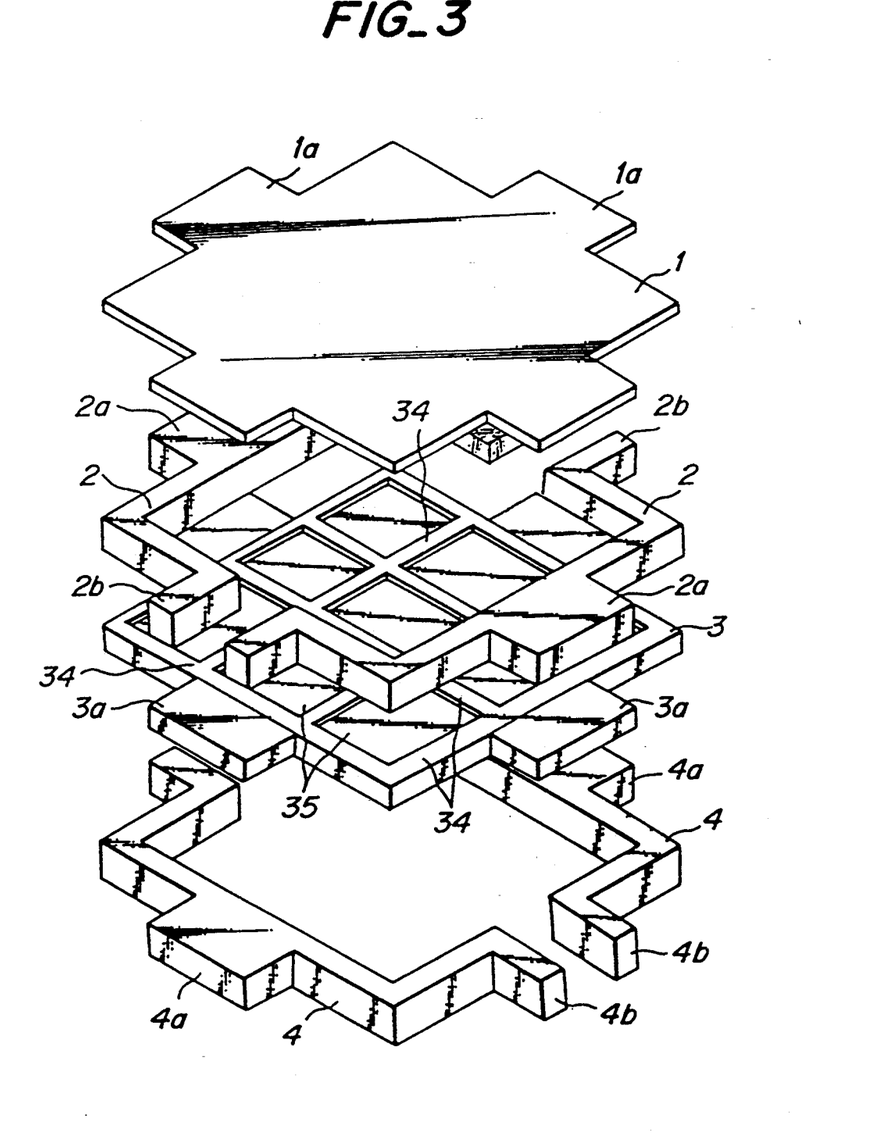
FIG. 3 is an exploded perspective view illustrating one embodiment of the SOFC according to the invention.
Figure 4:
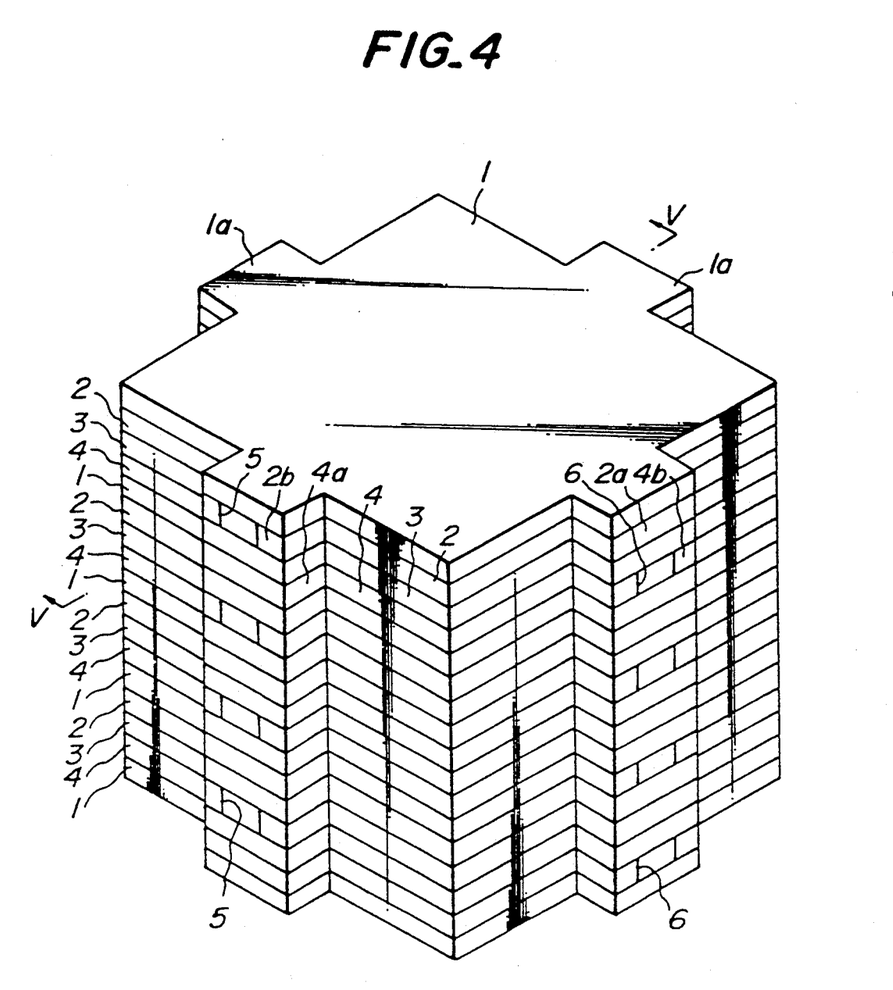
FIG. 4 is a perspective view illustrating the SOFC composed of the components shown in FIG. 3.
Figure 5:
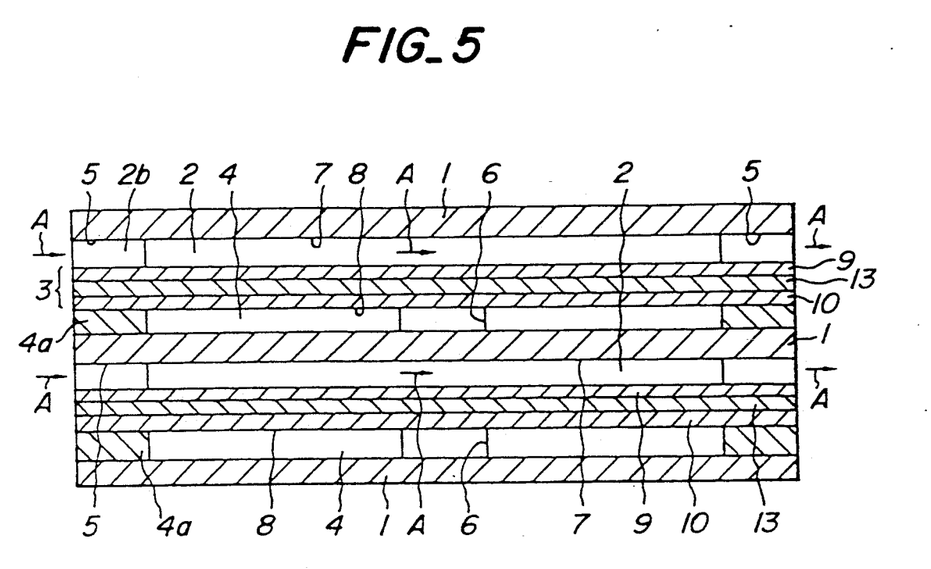
FIG. 5 is a sectional view of the SOFC taken along a line V—V in FIG. 4.

FIG. 4 is a perspective view illustrating such an SOFC according to an embodiment of the invention, and FIG. 3 is an exploded perspective view of a part of the SOFC. FIG. 5 is a sectional view of the SOFC taken along the line V—V in FIG. 4.

Referring to FIG. 3, components of the SOFC will be explained. A separator plate 1 is in the form of a square flat plate whose four sides are provided with rectangular projections 1a, respectively. The separator plate 1 is made of a material which has oxidation resistance, reduction resistance and electron conductivity.

A pair of air electrode spacers 2 are placed on an under side of the separator plate 1. The main part of each of the spacers 2 has a substantially U-shaped plane form, which is provided with a pair of projections 2b aligned with each other and a rectangular plane projection 2a. As shown in FIG. 3, the aligned projections 2b of a pair of the air electrode spacers 2 are opposed to each other, while the projections 2a are directed toward opposite directions. The spacers 2 are made of a material having oxidation resistance and electron conductivity.

A SOFC element 3 is in the form of a square flat plate whose four sides are provided with rectangular projections 3a. As shown in FIG. 5, the SOFC element 3 includes an ion-conductive ceramic plate 13, which has an air electrode 9 and a fuel electrode 10 formed on upper and lower surfaces thereof, respectively. In FIG. 5, ribs are omitted for simplicity.

It should be noted that the ion-conductive ceramic plate 13 except the projections 3a is formed, on the side of the air electrode, with a lattice pattern of the ribs 34 in four rows and four columns in the same manner as the ion-conductive ceramic plate 26 shown in FIG. 1. Nine recesses 35 are formed between the ribs 34. In FIG. 3, lead lines of reference numerals 34 and 35 are depicted by broken lines, because the air electrode (not shown) is provided on the surface of the ion-conductive ceramic plate 3.

A pair of fuel electrode spacers 4 are placed on an under surface of the SOFC element 3. The main part of each of the spacers 4 has a substantially U-shaped plane form, which is provided with a pair of projections 4b aligned with each other and a rectangular plane projection 4a. As shown in FIG. 3, the aligned projections 4b of a pair of the fuel electrode spacers 4 are opposed to each other, while the projections 4a are directed toward opposite directions. The spacers 4 are made of a material having reduction resistance and electron conductivity.

As shown in FIG. 4, these components are laminated in the order of the separator plate 1, the air electrode spacers 2, the SOFC element 3, the fuel electrode spacers 4 and a further separator plate 1. Only a part of the laminated construction is shown in FIGS. 3 and 5 for the sake of clarity. In laminating these members, they are positioned so that the outer contours of the respective projections 1a, 2a, 2b, 3a, 4a and 4b are substantially vertically aligned.

As shown in FIGS. 4 and 5, an oxidizing gas chamber 7 is defined by the separator plate 1, a pair of the spacers 2 and the flat plate-shaped SOFC element 3. The air electrode 9 is of course opposed to the oxidizing gas chamber 7. An oxidizing gas opening 5 is defined by the separator plate 1, a pair of the opposed projections 2b and the flat plate-shaped SOFC element 3. A pair of the oxidizing gas openings 5 are provided on both sides in this embodiment.

A fuel gas chamber 8 is defined by the separator plate 1, a pair of the spacers 4 and the flat plate-shaped SOFC element 3. The fuel electrode 10 is of course opposed to the fuel gas chamber 8. A fuel gas opening 6 is defined by the separator plate 1, a pair of the opposed projections 4b and the flat plate-shaped SOFC element 3. A pair of the fuel gas openings 6 are provided on both sides in this embodiment.

Ultimately, the oxidizing gas chambers 7 and the fuel gas chambers 8 are alternately provided, and are separated by the SOFC elements or the separator plates 1.

The laminated construction of the SOFC element itself is not shown in FIGS. 3 and 4. In FIG. 5, the ribs 34 or the recesses 35 formed in the ion-conductive ceramic plate 13 are not shown in order to avoid complication of the figure.

In operating the SOFC, an oxidizing gas is supplied through one of the two oxidizing gas openings 5 as shown by arrow A in FIG. 5. The oxidizing gas flows through the oxidizing gas chamber 7 in the arrow A direction, and is exhausted from the other oxidizing gas opening 5. On the other hand, when a fuel gas is supplied through one of the fuel gas openings 6, the fuel gas flows through the fuel gas chamber 8 and is exhausted from the other fuel gas opening 6. In this embodiment, the oxidizing gas flows perpendicularly to the flow of the fuel gas. However, the flows of these gases may be parallel to each other in the same direction or in opposite directions.

The oxidizing gas produces oxygen ions at the interface between the air electrode 9 and the ion-conductive ceramic plate 13. These oxygen ions move through the ion-conductive ceramic plate 13 to the fuel electrode 10 where the oxygen ions react with the fuel and release electrons to the fuel electrode 10.

The fuel electrode 10 of the flat plate shaped SOFC element 3 and the air electrode 9 of the vertically adjacent SOFC element 3 are electrically connected to each other through the fuel electrode spacer 4, the separator plate 1, and the air electrode spacer 2 which all have electron conductivity. Therefore, several SOFC elements 3 are electrically connected in series in vertical directions in FIGS. 4 and 5. As shown in FIG. 4, each stack is provided with the separator plates 1 on its upper and lower ends. Therefore, electric power can be obtained by connecting a load between a pair of the separator plates 1.

The separator plates 1 should have electron conductivity and resistance to the fuel and oxidizing gases to be used in operating the SOFC. The following materials fulfilling these requirements may be recited.

(1) Alloys such as Ni-Cr, Ni-Fe-Cr, Ni-Fe-Cr-Al, Co-Ni-Cr, Fe-Cr, and Fe-Cr-Al, high melting point noble metals such as Pt, Au, and Pd and Ni alloy.

(2) $LaCrO_3$ ceramics and $LaMnO_3$ ceramics.

The air electrode spacers 2 should have electron conductivity and oxidizing gas resistance. Following materials are preferable for the air electrode spacer 2.

(1) Ceramics of $LaMnO_3$, $LaCoO_3$, $La_{1-x}Sr_xMnO_3$ and $LaNiO_3$.

(3) High melting point noble metals such as Pt, Au and Pd.

The fuel electrode spacer 4 should have electron conductivity and fuel gas resistance. Following materials are preferable for the fuel electrode spacer 4.

(1) Metals such as Ni and Co
(2) Nickel-zirconia cermet

The air electrode 9 may be made of a conductive perovskite-type oxide such as $LaMnO_3$, $CaMnO_3$, $LaNiO_3$, $LaCoO_3$ or $LaCrO_3$ doped or not. $LaMnO_3$ doped with strontium is preferable. The fuel electrode 10 is preferably made of nickel-zirconia cermet, cobalt-zirconia cermet, or chromium-zirconia cermet.

A gas containing a fuel gas such as hydrogen, reformed hydrogen, carbon monoxide, or hydrocarbon is used as the fuel gas. As the oxidizing gas, a gas containing an oxidizing agent such as oxygen or hydrogen peroxide and the like is used.

In the embodiment shown in FIG. 4, the reduction-resistant and oxidation-resistant separator plates 1 are provided on the upper and lower ends of the SOFC (stack). However, since the separator plate 1 on the top of the stack faces only to the oxidizing gas chamber 7, the separator plate 1 is not necessarily required to be reduction-resistant. On the other hand, since the separator plate 1 at the bottom of the stack faces only to the fuel gas chamber 8, this separator plate 1 does not necessarily need to be oxidation-resistant.

With the SOFC as described above, since the ion-conductive ceramic plate 13 is provided with the ribs 34 to form the lattice construction on the surface of the SOFC, as explained in connection with FIG. 1, the mechanical strength and output of the SOFC element can be increased.

Moreover, since the main components such as spacers 2 and 4, the separator plate 1 and the ion-conductive ceramic plate 13 have flat plate-shapes, they can be produced by a conventional shaping method such as tape-casting method or press-forming method. Therefore, these components can be easily produced with low costs, without requiring apparatuses on a large scale as in chemical vapor deposition (CVD) or electrochemical vapor deposition (EVD). Particularly, since the ion-conductive ceramic plate 13 needs no CDV, EVD or the like for its production, the productivity is high and it is possible to produce ion-conductive ceramic plates 13 having wider areas. The ribs can be formed on the ion-conductive ceramic plate 13 by the methods described above. At any rate, the gas phase deposition method such as CVD or EVD is not needed for the production of the SOFC.

Moreover, a plurality of SOFC elements 3 are easily connected in series only by laminating the above components.

Furthermore, electric current is caused to be collected through the spacers 2 and 4 and the separators 1 themselves without requiring any particular current collector for connecting the SOFC elements 3. Therefore, the electric current flows through the entire contact surfaces of the components, so that resistances at the connection portions are low resulting in less voltage drop. Moreover, it is possible to enlarge the contact surface between the air electrode 9 and the spacer 2 and that between the fuel electrode 10 and the spacer 4. Further, as these contact surfaces linearly extend along the shapes of the spacers 2 and 4, so that distances are short, through which the electric current flows in parallel along and within the films of the air electrode 9 and the fuel electrode 10. Therefore, voltage losses in the air electrode 9 and the fuel electrode 10 are very small by the synergistic effects thereof.

Moreover, a porous support member is not used for the flat plate-shaped SOFC element 3, so that the electric resistance is lower by that of such a support member. Further, the materials of the separator plate 1, the air electrode spacer 2 and the fuel electrode spacer 4 can be most suitably selected in consideration of the electron conductivity and the resistance to the atmospheres, so that the internal resistance of the entire stack can be restrained to a low value. If the separator plate 1, the air electrode spacer 2 and the fuel electrode spacer 4 were integrally formed, the whole unit must be formed by a material which has reduction resistance, oxidation resistance and electron conductivity. Consequently, the range of material to be selected will be very narrow and it becomes difficult to restrain the internal resistance of the entire stack to a low value.

Moreover, since all the components of the stack according to the invention are in the form of flat plates, a simple bonding method such as bonding with lower melting point material and co-sintering can be employed in laminating the respective components. Furthermore, the internal resistance and structural strength of the stack can be optimized by properly changing the thicknesses of the separator plate 1 and the spacers 2 and 4.

In producing such a SOFC, it is preferable that after an ion-conductive ceramic plate formed with ribs is produced by sintering as described above, the ion-conductive ceramic plate is formed, with an air electrode 9 and a fuel electrode 10 on opposite surfaces thereof, respectively. This process can avoid formation of an insulating layer at interfaces between the ceramic plate and electrodes, since the electrode forming process only requires a temperature level just to bond those electrodes to the electrolyte plate, and does not require higher temperature necessary to sinter the electrolyte plate itself.

Moreover, it is preferable that after a separator plate 1, an air electrode spacer 2 and fuel electrode spacer 4 are separately produced by sintering, the air electrode spacer 2 and the fuel electrode spacer 4 are bonded to opposite surfaces of the separator plate 1 by means of an electron conductive adhesive. In this manner, it becomes possible to sinter the separator plate 1 and the spacers 2 and 4 under the optimum conditions commensurate with the respective materials of these components.

Since the components of the stack shown in FIG. 4 are all in the form of flat plates, they can be easily formed by tape-casting, press-forming, doctor blade methods. In order to obtain green sheets of a predetermined configuration, it is necessary to punch a raw green sheet.

Following materials are preferable as the electron conductive adhesive.

Figure 6:
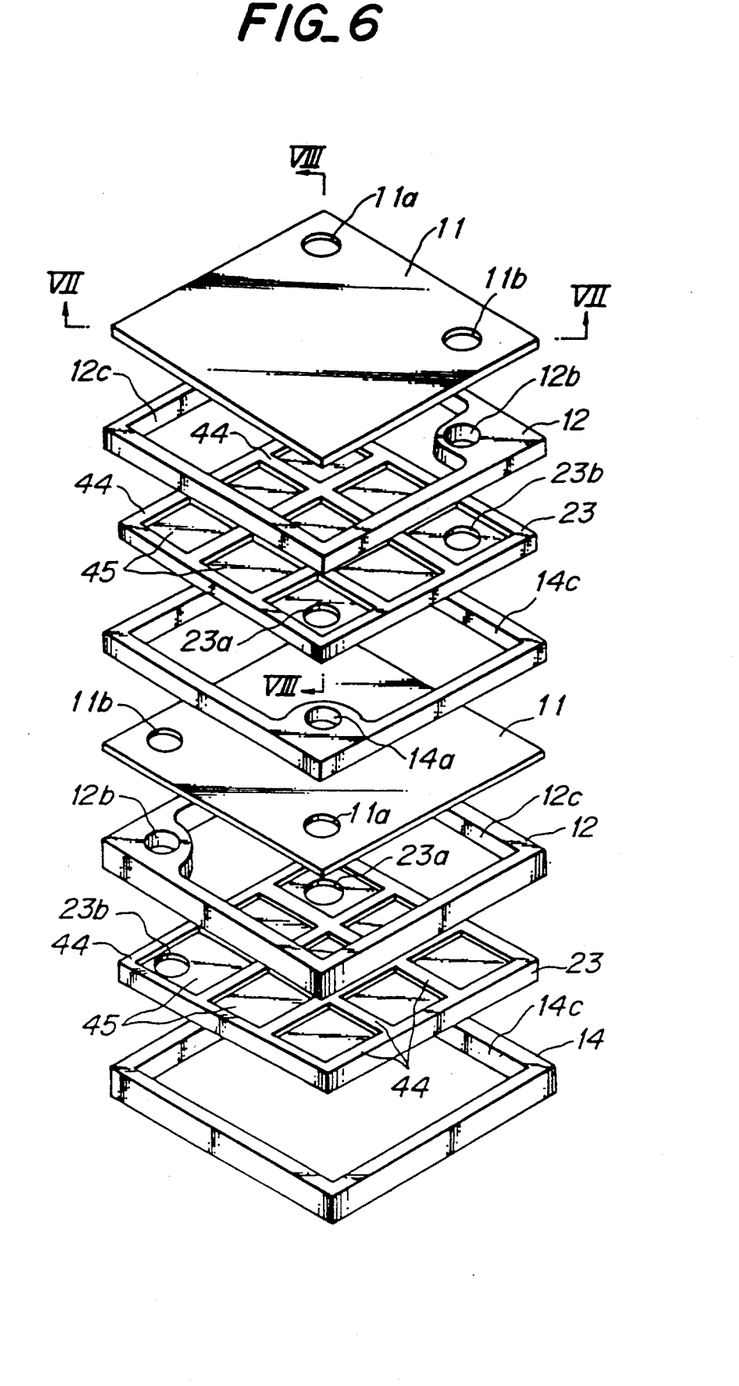
FIG. 6 is an exploded perspective view illustrating another embodiment of the SOFC according to the invention.
Figure 7:
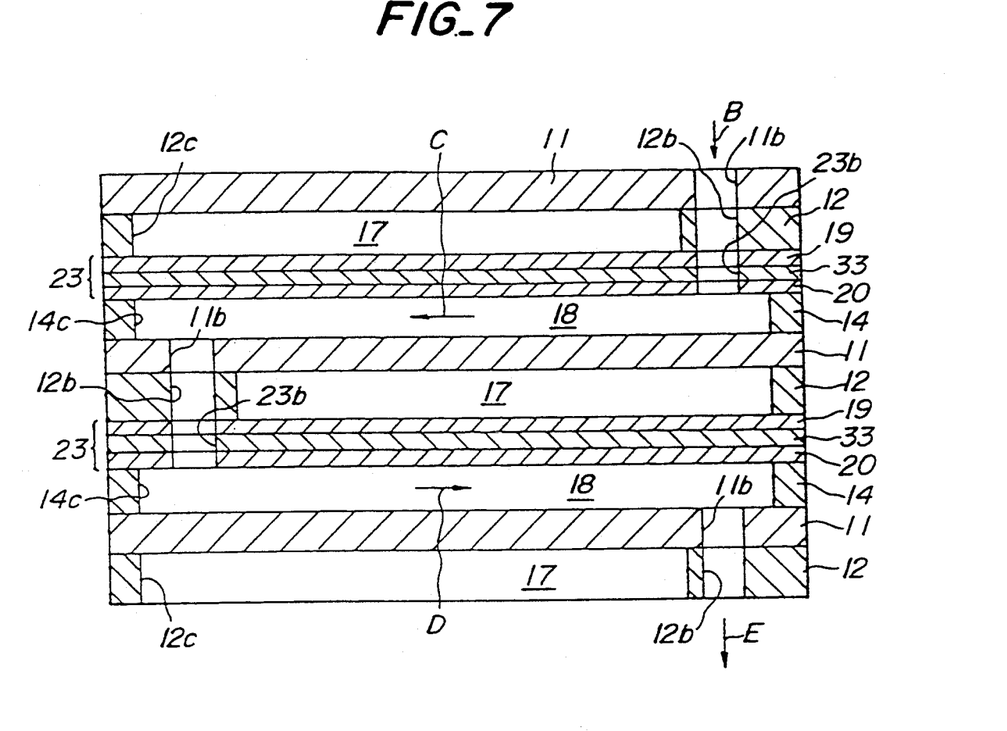
FIG. 7 is a sectional view of the SOFC taken along a line VII—VII in FIG. 6.
Figure 8:
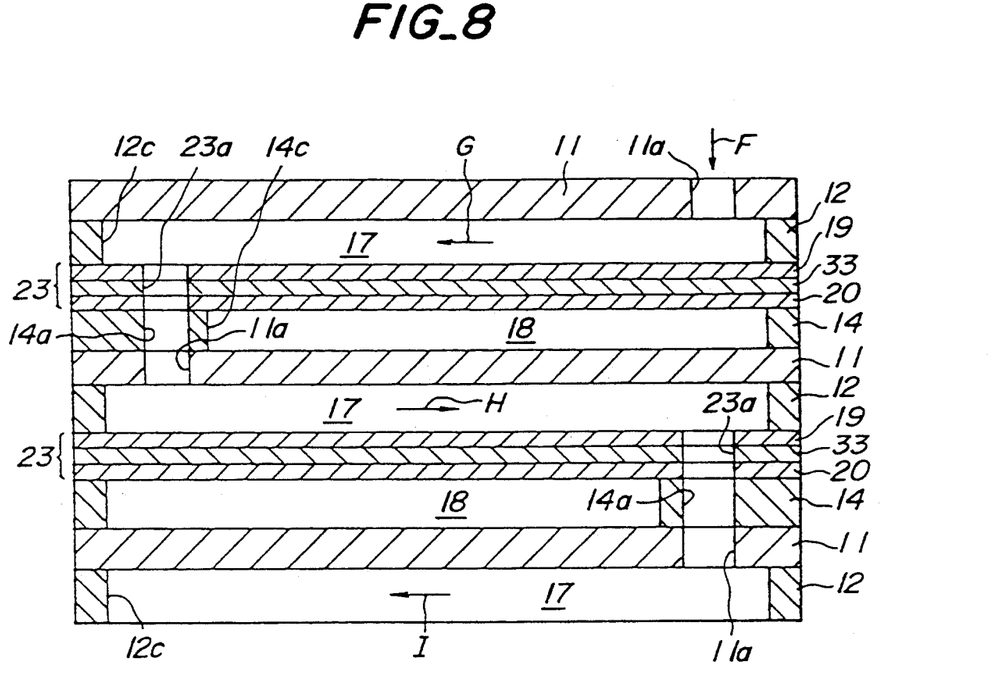
FIG. 8 is a sectional view of the SOFC taken along a line VIII—VIII in FIG. 6.

(1) Paste of Pt, Pd, Ag-Pd, Au or Ni
(2) Paste of $LaMnO_3$, $LaCrO_3$ or $LaCoO_3$ FIG. 6 illustrates a part of the SOFC of another embodiment according to the invention in an exploded perspective view. FIGS. 7 and 8 are sectional views of the SOFC taken along lines VII—VII and VIII—VIII in FIG. 6, respectively.

First, a square separator plate 11 is arranged in the uppermost portion. The separator plate 11 is made of a material which has oxidation resistance, reduction resistance, and electron conductivity. The plate 11 may be actually formed by the same material and in the same manner as explained with respect to the above separator plate 1. The separator plate 11 is formed with a circular oxidizing gas opening 11a and a circular fuel gas opening 11b.

An air electrode spacer 12 is laminated on the underside of the separator plate 11. The spacer 12 is formed with a substantially square punched portion 12c convexed at its one corner where a fuel gas opening 12b is formed. The air electrode spacer 12 is made of a material having oxidation resistance and electron conductivity. The space 12 may be actually formed by the same material and in the same manner as explained with respect to the air electrode spacer 2.

A flat plate-shaped SOFC element 23 is laminated on the underside of the air electrode spacer 12. The element 23 is formed with a circular oxidizing gas opening 23a and a circular fuel gas opening 23b. In more detail, the flat plate-shaped ion-conductive ceramic plate 33 of the SOFC element 23 is formed with an air electrode 19 and a fuel electrode 20 on upper and lower surfaces, respectively.

It should be noted in this case, however, that the ion-conductive ceramic plate 33 is formed, on the side of the air electrode, with a lattice pattern by ribs 44 in four rows and four columns in the same manner as the ion-conductive ceramic plate 26 shown in FIG. 1. Nine recesses 45 are formed between the ribs 44. In FIG. 6, lead lines of reference numerals 44 and 45 are depicted as broken lines because the air electrode (not shown) is provided on the surface of the ion-conductive ceramic plate 33.

The laminated construction of the SOFC element itself is not shown in FIG. 6. In FIGS. 7 and 8, the ribs 44 and the recesses 45 formed in the ion-conductive ceramic plate 33 are omitted in order to avoid complication of the figures.

A fuel electrode spacer 14 is laminated on the underside of the flat plate-shaped SOFC element 23. The spacer 14 is formed with a substantially square punched portion 14c convexed at its one corner where an oxidizing gas opening 14b is formed. The fuel electrode spacer 14 is made of a material which has reduction resistance and electron conductivity. The spacer 14 may be actually formed by the same material and in the same manner as explained in connection with the fuel electrode spacer 4.

On the underside of the fuel electrode spacer 14 are laminated a separator plate 11, an air electrode spacer 12, a flat plate-shaped SOFC element 23 and a fuel electrode spacer 11. Further components are laminated in the same manner. A separator plate 11 is located at the lowermost end of the stack. Electric power can be obtained by connecting a load between the separator plates 11 at the upper and lower ends.

In the laminated SOFC (stack), an oxidizing gas chamber 17 is defined by the separator plate 11, the air electrode spacer 12 and the flat plate-shaped SOFC element 23 a shown in FIGS. 7 and 8. On the other hand, a fuel gas chamber 18 is defined by the separator plate 11, the fuel electrode spacer 14 and the flat plate-shaped SOFC element 23. In this case, the oxidizing gas chamber 17 corresponds to the punched portion 12c of the air electrode spacer 12 in disassembled state of the SOFC, while the fuel gas chamber 18 corresponds to the punched portion 14c of the fuel electrode spacer 14. Of course, the air electrode 19 faces to the oxidizing gas chamber 17, while the fuel electrode 20 faces to the fuel gas chamber 18.

Next, the flow of the fuel gas will be explained.

When the separator plates 11, the spacers 12 and 14 and the flat plate-shaped SOFC elements 23 are laminated, the fuel gas openings 11b, 12b and 23b are vertically aligned and communicated with each other as shown in FIG. 7. The fuel gas opening 12b is separated from the oxidizing gas chamber 17. In FIG. 7, the fuel gas openings 11b, 12b and 23b are located on the right side in the first stack, on the left side in the second stack, and on the right side in the third stack. They are located in the same manner in the following stacks.

In operating the SOFC, a fuel gas is supplied thereinto as shown by arrow B. The fuel gas flows through the fuel gas openings 11b, 12b and 23b into the fuel gas chamber 18 in which the fuel gas flows as shown by arrow C. After arriving at the left end of the fuel gas chamber 18, the fuel gas again flows through the fuel gas openings 11b, 12b and 23b at the left side of the stack into the fuel gas chamber 18 in which the fuel gas flows as shown by arrow D. Thereafter, the fuel gas arrives at the right hand end of the fuel gas chamber 18 and flows through the fuel gas openings 11b and 12b as shown by arrow E. The fuel gas continues to flow from the upper end to the lower end of the SOFC.

Next, the flow of the oxidizing gas will be explained.

When the separator plates 11, the spacers 12 and 14, and the flat plate-shaped SOFC elements 23 are laminated, the oxidizing gas openings 11a, 14a and 23a are vertically aligned and communicated with each other as shown in FIG. 8. The oxidizing gas opening 14a is separated from the fuel gas chamber 18. In FIG. 8, the oxidizing gas opening 11a is located on the right side in the uppermost separator plate 11. The vertically aligned oxidizing gas openings 23a, 14a and 11a are located on the left side in the first stack, on the right side in the second stack, and on the left side in the third stack. They are located in the same manner in the following stacks.

In operating the SOFC, an oxidizing gas is supplied thereinto as shown by arrow F. The oxidizing gas flows through the fuel gas opening 11b into the oxidizing gas chamber 17 in which the oxidizing gas flows as shown by arrow G. After arriving at the left end of the oxidizing gas chamber 17, the oxidizing gas flows through the oxidizing gas openings 23a, 14a and 11a into the oxidizing gas chamber 17 in which the oxidizing gas flows as shown by arrow H. Thereafter, the oxidizing gas arrives at the right hand end of the oxidizing gas chamber 17 and flows through the oxidizing gas openings 23a, 14a and 11a in the oxidizing gas chamber 17 as shown by arrow I. The oxidizing gas continues to flow from the upper end to the lower end of the SOFC in this manner.

In the embodiment, since the ion-conductive ceramic plate 33 is also provided on its surface with the ribs 44 to form the lattice construction, the mechanical strength and output of the SOFC element can be maximized. Moreover, since the separator plates 11, the air electrode spacers 12, the flat plate-shaped SOFC elements 23 and the fuel electrode spacers 14 are successively laminated to form the stacks, the effects explained with the SOFC shown in FIGS. 3 to 5 can be also accomplished in this case. Further, these components can be laminated in a manner similar to that of the SOFC shown in FIGS. 3 to 5.

In addition, the fuel gas is caused to flow from the upper end to the lower end of the SOFC without requiring separate supply of the fuel gas to every fuel gas chamber 18. Therefore, the fuel gas supply mechanism can be largely simplified, and sealing can be easily effected to prevent leakage of the fuel gas. The same effects can be also achieved with respect to the flowing of the oxidzing gas. Moreover, the fuel gas and the oxidizing gas are caused to flow diagonally across the substantially square fuel gas chamber 18 and the oxidizing gas chamber 17 in the arrow directions C and D, and G, H and I, respectively. Accordingly, it is easy to supply the fuel gas and oxidizing gas uniformly all over the surfaces of the fuel and air electrodes 20 and 19.

It is more preferable that the fuel gas does not directly contact the walls of the fuel gas openings 11b, 12b and 23b in the embodiment shown in FIGS. 6 to 8. For this purpose, a fuel gas conduit is formed from a material which is at least reduction-resistant, and this fuel gas conduit is fitted in the fuel gas openings 11b, 12b and 23b so that the fuel gas flows in the internal space of the fuel gas conduit without directly contacting the fuel gas openings.

It is also more preferable that the oxidizing gas does not directly contact the walls of the oxidizing gas openings 23a, 14a and 11a. For this purpose, an oxidizing gas conduit is formed from a material which is at least oxidation-resistant, and this oxidizing gas conduit is fitted in the oxidizing gas openings 23a, 14a and 11a so that the oxidizing gas flows in the internal space of the oxidizing gas conduit without directly contact the oxidizing gas openings.

In the above embodiments, each of the SOFC stacks may be turned upside down. Moreover, the SOFC stacks may be supported in the horizontal direction.

While the spacers 2 and 4 are divided into two parts, respectively, in the embodiment shown in FIGS. 3 to 5, they may be divided into three or more parts.

In the above embodiments, the planar configurations of the components of the SOFC may be changed in various ways. Moreover, the oxidizing gas openings 5, 23a, 14a and 11a and the fuel gas openings 6, 11b, 12b and 23b may have cross-sections other than the circular cross-sections. Moreover, the numbers of these openings may be increased.

In the embodiment of FIG. 6, the second separator plate 11 is rotated by 180° from the position of the first separator plate 11. However, the second separator plate 11 may be rotated by 90° relative to the uppermost separator plate 11. Other components must of course be positionally adjusted to the separator plates 11 at the same time.

In the embodiments shown in FIGS. 3 to 8, the ion-conductive ceramic plate 13 or 33 is formed with the ribs 34 or 44 on the air electrode side. However, the ribs 34 or 44 may be provided on the fuel electrode side of the ceramic plate 13 or 33. Moreover, the ion-conductive ceramic plate 13 or 33 may be provided, on both main surfaces, with ribs 34 or 44 to form lattice constructions.

Moreover, the flat plate-shaped SOFC elements shown in FIGS. 1 to 8 can be used as a part of a so-called flat plate type SOFC (stack) of another type.

According to the invention, since the ion-conductive ceramic plate is formed with a plurality of the ribs continued as viewed in a plane, these ribs strongly support the ceramic plate. Since the ion-conductive ceramic plate has portions not covered by the ribs and exposed outside, the ion-conductive ceramic plate itself can be made thinner to diffuse ions at the portions of the ceramic plate devoid of the ribs so as to produce electric power. Even when the ion-conductive ceramic plate itself is made thin, the ceramic plate is supported by a plurality of the ribs continuity to each other. Consequently, according to the invention, the fracture and cracking of the SOFC element can be effectively prevented and output of the SOFC element can be advantageously increased.

What is claimed is:

1. A method for producing a solid oxide fuel cell comprising the steps of:
 press contacting a flat plate-shaped green sheet made of an ion-conductive ceramic molding material and a rib-forming green sheet made of substantially the same material as that of the flat plate-shaped green sheet and having a unitary shape formed by connecting elongated portions thereof to each other;
 sintering the press-contacted flat plate-shaped green sheet and the rib-forming green sheet to form an ion-conductive ceramic plate from the flat plate-shaped green sheet and to form ribs from the rib-forming green sheet;

forming an air electrode on one main surface of the ion-conductive ceramic plate; and forming a fuel electrode on the other main surface of the ion-conductive ceramic plate.

2. A method for producing a solid oxide fuel cell comprising the steps of:

sintering a flat plate-shaped green sheet made of an ion-conductive ceramic molding material to form an ion-conductive ceramic plate;

sintering a rib-forming green sheet having a unitary shape formed by connecting elongated portions thereof to each other to form a rib-forming plate;

bonding the ion-conductive ceramic plate and the rib-forming plate to each other;

forming an air electrode on one main surface of the ion-conductive ceramic plate; and forming a fuel electrode on the other main surface of the ion-conductive ceramic plate.

3. The method of claim 2, further comprising coating a slurry of an ion-conductive ceramic raw material on surfaces of the ion-conductive ceramic plate and rib-forming plate to be bonded, and then bonding said surfaces together by heating.

4. A solid oxide fuel cell comprising a flat plate-shaped solid oxide fuel cell element comprising:

a square planar ion-conductive ceramic plate having intersecting ribs formed on at least one main surface thereof in the form of a checkerboard pattern lattice;

an air electrode formed on one main surface of said ion-conductive ceramic plate; and a fuel electrode formed on the other main surface of said ion-conductive ceramic plate.

5. The solid oxide fuel cell of claim 4, further comprising:

an air electrode spacer laminated on said one main surface of said ion-conductive ceramic plate, said air electrode spacer comprising a material having oxidation resistance and electronic conductivity;

a first separator plate laminated on said air electrode spacer, said first separate plate comprising a material having oxidation resistance, reduction resistance and electronic conductivity;

an oxidizing gas chamber defined by said first separator plate, said air electrode spacer and said flat plate-shaped solid oxide fuel cell element;

a fuel electrode spacer laminated on said other main surface of said ion-conductive ceramic plate, said fuel electrode spacer comprising a material having reduction resistance and electronic conductivity;

a second separator plate laminated on said fuel electrode spacer, said second separator plate comprising a material having oxidation resistance, reduction resistance and electronic conductivity; and a fuel gas chamber defined by said second separator plate, said fuel electrode spacer and said flat plate-shaped solid oxide fuel cell element.

6. The solid oxide fuel cell of claim 5, wherein said first and second separator plates are square flat plates whose four sides are formed with rectangular projections, respectively, each of said air electrode spacer and said fuel electrode spacer has a substantially U-shaped form including a pair of aligned projections outwardly extending from ends of legs of the U-shaped form and a rectangular projection outwardly extending from a bottom of the U-shaped form, and said flat plate-shaped solid oxide fuel cell element is a square flat plate whose four sides are formed with rectangular projections to conform with the projections of the separator plates and the spacers.

7. The solid oxide fuel cell of claim 5, wherein said first and second separator plates are substantially square plate plates each formed with an oxidizing gas opening and a fuel gas opening, respectively, said air electrode spacer is a substantially square flat plate formed with a substantially square punched portion convex at its corner where a fuel gas opening is formed, said flat plate-shaped solid oxide fuel cell element is a square flat plate formed with an oxidizing gas opening and a fuel gas opening, and said fuel electrode spacer is a substantially square flat plate formed with a substantially square punched portion convexed at its corner where an oxidizing gas opening is formed, said oxidizing gas opening and said fuel gas opening of the fuel element being in conformity with said oxidizing gas opening of the air electrode spacer and said fuel gas opening of the fuel electrode spacer, respectively.

8. A solid oxide fuel cell comprising a flat plate-shaped solid oxide fuel cell element comprising:

an ion-conductive ceramic plate having at least two intersecting ribs formed on at least one main surface thereof;

an air electrode formed on one main surface of said ion-conductive ceramic plate; and a fuel electrode formed on the other main surface of said ion-conductive ceramic plate.

* * * * *